United States Patent
Keukens

(10) Patent No.: US 11,190,386 B2
(45) Date of Patent: Nov. 30, 2021

(54) SMART ADJACENT-CHANNEL INDICATING/SCANNING FOR FM MODULATION

(71) Applicant: NXP B.V., Eindhoven (NL)

(72) Inventor: Erik Keukens, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/855,698

(22) Filed: Apr. 22, 2020

(65) Prior Publication Data

US 2021/0336831 A1     Oct. 28, 2021

(51) Int. Cl.
*H04L 5/12* (2006.01)
*H04L 27/26* (2006.01)
*H04H 20/42* (2008.01)

(52) U.S. Cl.
CPC ....... *H04L 27/2666* (2013.01); *H04H 20/426* (2013.01); *H04L 27/2691* (2013.01)

(58) Field of Classification Search
CPC ............. H04L 27/2666; H04L 27/2691; H04L 1/0054; H04L 1/005; H04L 25/067; H04L 1/0066; H04H 20/426; H03M 13/41
USPC ........ 375/262, 261, 260, 259, 219, 295, 316
See application file for complete search history.

(56) References Cited

U.S. PATENT DOCUMENTS

| 10,862,519 B1 | 12/2020 | Keukens et al. | |
|---|---|---|---|
| 10,924,142 B1 | 2/2021 | Kuekens et al. | |
| 10,999,102 B1 | 5/2021 | Keukens | |
| 2005/0181741 A1* | 8/2005 | Raj | H03D 3/006 455/73 |
| 2007/0037538 A1* | 2/2007 | Shatara | H04B 7/0814 455/277.2 |
| 2010/0130152 A1* | 5/2010 | Whikehart | H04B 1/1036 455/226.2 |

OTHER PUBLICATIONS

U.S. Appl. No. 16/804,358, filed Feb. 28, 2020, entitled: Adjacent Channel Suppression Based on Adjacent Channel Properties in FM Radio Broadcast Receivers. The Examiner is referred to the copending patent prosecution of the common Applicant (no attachment).

(Continued)

*Primary Examiner* — Zewdu A Kassa

(57) ABSTRACT

As may be used in connection with frequency-modulated (FM) radio systems and receivers processing FM broadcast transmissions, exemplary aspects are directed to a method may be performed by the receiver circuitry to receive FM broadcast signaling within a particular bandwidth for which a plurality of target channels are to have a specified channel spacing. The method may include: assessing detected energy for a first adjacent channel having the specified channel spacing and having a frequency immediately adjacent to a targeted one of the plurality of target channels; and discerning whether the detected energy is associated with ultrasonic energy in detected modulation energy (e.g., ultra-sonic noise in an MPX signal), and/or is associated with modulation energy (e.g., due to over-modulation) from a second adjacent channel also having such specified channel spacing.

20 Claims, 4 Drawing Sheets

(56) References Cited

OTHER PUBLICATIONS

U.S. Appl. No. 16/804,391, filed Feb. 28, 2020, entitled: FM Spectrum Estimation Relative to Adjacent Channel. The Examiner is referred to the copending patent prosecution of the common Applicant (no attachment).
U.S. Appl. No. 16/855,741, filed Apr. 22, 2020, entitled: Bandwidth Control in Radio Frequency Broadcast Signals Relative to Adjacent-Channel Signal Properties. The Examiner is referred to the copending patent prosecution of the common Applicant (no attachment).
U.S. Appl. No. 16/855,762, filed Apr. 22, 2020, entitled: RF Level Detection for Desired Channel Among Multiple Broadcast Channels. The Examiner is referred to the copending patent prosecution of the common Applicant (no attachment).

* cited by examiner

SMART ADJACENT-CHANNEL INDICATING/SCANNING FOR FM MODULATION

OVERVIEW

Aspects of various embodiments are directed to FM (frequency modulation) communications and including, for example, FM radio broadcast communications systems in which a desired reception channel is selected, for example for capturing data carried by the FM, by causing the receiver circuitry to scan possibly-available channels in the presence of one or more possibly-interfering adjacent channels.

In FM communications systems, accurately receiving and capturing the information provided by the carrier frequency is important. This is often achieved based on a general understanding of the surrounding frequency spectrum and by avoiding overlap and interference from other signals in the adjacent spectrum. Consider such an adjacent signal, for example, in the common FM radio broadcast systems. In such FM radio systems, interference often occurs from nearby broadcast radio signals (or channels) and the deviation of one of these adjacent broadcast signal may readily interfere with the other. The deviation or sometimes "instantaneous frequency deviation" in such systems may be sometimes referred to as the difference between the frequency of the carrier of the broadcast FM signal and its center frequency. In order to avoid overlap and interference from adjacent broadcast FM signals, various approaches have been pursued, oftentimes by estimating this deviation based on an average of the mono-audio amplitude of the signal associated with the carrier frequency or by the use of expense high-end equipment such as commercially-available AC-DC converters (e.g., QPD 25-12 Series).

Reliability for many of these deviation-measurement detectors may depend on the correct bandwidth selection of the measured channel. For some systems, an important consideration may be to ensure that the bandwidth selection of the measured signal has no energy of its adjacent channel and that no signal capture and/or measurement of the desired channel is influenced by any signal which is outside the bandwidth selected for receiving the desired channel. For example, if too narrow of a bandwidth for the measured channel is selected, the detector would indicate low modulation for this channel. Indicating such low modulation would in turn indicate that the bandwidth can be set even narrower. Depending on the used bandwidth control algorithm, this can cause further problems associated with the deviation measurements.

In a receiver that scans where channels are available, it is important to be able to distinguish channels from the part of the spectrum corresponding to adjacent channels. A common method for this type of channel scanning is to use the known spacing between channels and then to set the bandwidth for all such channels to be sufficiently narrow within such spacing specifications to be sure the adjacent channels are excluded. In specific FM radio communications systems, known spacing between channels is defined for the broadcast transmissions through requirements as imposed by local standards or regulations of the applicable country or jurisdiction. However, even with these known channel spacings, the deviations associated with the broadcast signals can be problematic. For example, in European FM broadcast systems, for example, the channel spacing standard is 100 kHz and the maximum deviation is 75 kHz. This means that between two channels there is a possible overlap of 50 kHz where energy of both channels may reside at any given moment, thereby increasing the likelihood of adjacent channel breakthrough (interfering with the data carried by the desired channel). Similar FM broadcast issues exist in other regions such as in certain Asian regions (e.g., China) and in the USA. In the USA, the channel spacing standard is 200 kHz and the maximum deviation is 150, leading to possible overlap of 100 kHz. For some of these systems adjacent channels are detected to determine the bandwidth of the desired or targeted channel, and if the adjacent channel is not present as expected, the system may set the bandwidth of the desired channel on erroneous information, thereby selecting a bandwidth which is not at all optimized for delivery of a quality signal.

The ability to detect the presence of such adjacent channels accurately and reliably, however, is yet another challenge for many systems. Such problems become readily apparent, for example, with RF radio channel receivers used in spotty-reception regions such as in the mountains where many such radio receivers cannot readily discern whether energy at a frequency to an expected adjacent channel is energy that corresponds to an actual broadcast signal or is another phenomena such as interference. If the latter, many radio receivers are configured to discern mistakenly that such energy corresponds to an actual broadcast signal and, consequently, they mistakenly set the signal-receiving bandwidth based on the mistaken presence of actual broadcast signal at an adjacent channel.

SUMMARY

In accordance with the present disclosure, various example embodiments are directed to issues such as those addressed above and/or as may be apparent from the following disclosure concerning accurate and reliable detection in such FM broadcasting contexts.

According to one example, yet another related example, the present disclosure is directed to a method and related FM receiver circuitry which discerns accurately and reliably whether energy detected at adjacent channel frequencies correspond to actual frequency modulated (FM) broadcast signals. Such accurate discernment may be used to indicate, as examples, whether there is compliance with RF-communications broadcast criteria and/or to set the signal-receiving bandwidth for a given channel based on whether there is an actual broadcast signal at an adjacent channel.

In another example, the bandwidth of the wanted channel is based on a process in which the presence of detected energy at adjacent channel frequencies may be excluded depending on certain signal-strength properties of the channels. In this regard, one of various channel scanning methods uses an adaptive adjacent-channel-energy detection circuit to assess certain signal properties associated with apparent adjacent-channel signal strength, relative to a targeted one of the plurality of target channels in an RF frequency band of interest.

In more particular examples relating to the above process, aspects of the present disclosure are directed to a method and related circuitry are directed to receiving an RF broadcast signal and assessing certain signal properties therefrom with consideration, for example, of indications whether detected/measured energy, at a channel assessed according to a channel spacing (e.g., 100 kHz or 200 kHz spacing) associated with the RF broadcast, corresponds to: a detected modulation signal in which there is also ultra-sonic energy (e.g., ultra-sonic noise); and/or detecting or discerning that modulation signal energy is from another channel (e.g., one or both channels on the other side of and) adjacent to the assessed channel.

In a more specific example related to the above method and circuitry, an ultrasonic noise (USN) detection circuit may be used for processing the detected modulation signal, for example, in the form of a demodulated version of the RF signal (e.g., MPX signal that contains the audio carried by the modulation). This demodulated version of the RF signal would contain or indicate whether there is ultra-sonic energy (e.g., ultra-sonic noise) in the assessed channel which is possibly due to energy in one or both of the channels immediately adjacent to the assessed channel. Further, an unbalance (or sometimes "offset") detection circuit may be used for the detection (or discernment) that modulation-signal energy is from another channel (e.g., one or both channels on the other side of) the assessed channel.

In yet another more-specific example, in addition to use of such USN detection and unbalance circuitry, further aspects are directed to use of a level-detection circuit to assess relative differences in modulation-signal strength for the assessed channel ("first adjacent-channel"). In further-specific examples, signal processing circuitry is used to work through a logical/decision tree, based on the operations of these above-noted circuits, to discern and indicate whether the detected energy for the first adjacent channel corresponds to energy of an actual broadcast signal corresponding to an FM broadcast signal, or whether the detected energy in the first adjacent channel corresponds to energy caused by modulation in one or both channels on either side of the first adjacent-channel. As may become apparent, such accurate and reliable discernment may be important for many applications in which setting the bandwidth for the desired channel needs to be accurately set relative to energy-related parameters of the adjacent channel(s), to circuit-caused anomalies of the RF receiver, and/or over-modulation of the adjacent channel(s).

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
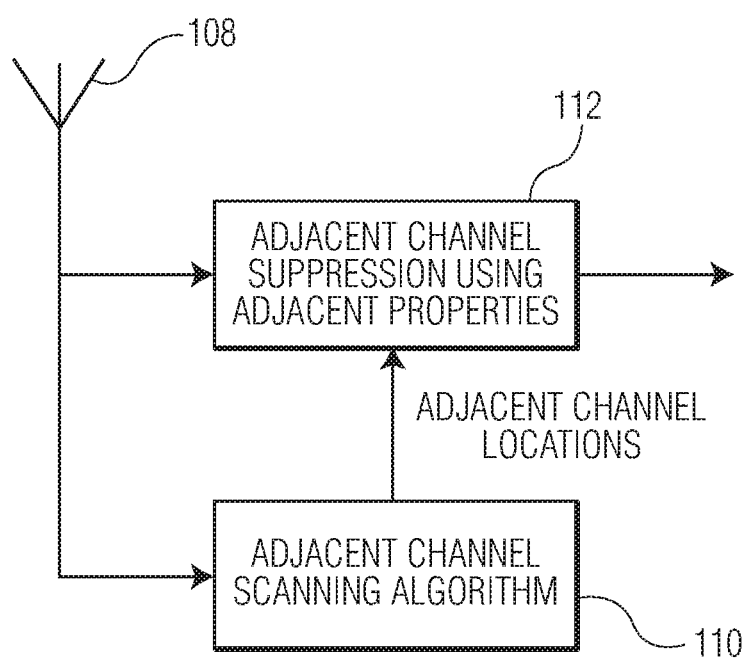
FIG. 1A is a circuit-based block diagram of a radio-frequency (FM) radio reception circuitry such as in an RF receiver, illustrating an example apparatus in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving reception and/or processing of a desired channel or signal ensuing from a frequency modulated (FM) broadcast transmission. This type of transmission may occur, for example, by way of the broadcasting from radio transmitters operated on behalf of publically-broadcast FM radio stations. While aspects of the present disclosure have been shown to be beneficial when used in the context of such FM radio broadcast signals and while the following discussion uses this context as examples to understand such aspects, the present disclosure is not necessarily so limited.

Accordingly, the present disclosure provides various specific examples with aspects and related details for discussion purposes. It should be apparent to one skilled in the art, however, that one or more other examples and/or variations of these examples may be practiced without all the specific details provided herein. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, embodiments involve processing an FM broadcast signal (e.g., as received via an FM broadcast transmission) in a frequency spectrum having separable segments respectively corresponding to different channels set at a fixed channel spacing (e.g., adjacent channels separated by 100 kHz, 200 kHz, etc., depending on the system). As is conventional, the information relevant to the broadcast is carried by modulating a carrier signal, sometimes the desired signal or channel; this desired channel may be typically selected by setting the bandwidth known, from historical or empirical evidence, to correspond to the frequency of the carrier signal and to avoid interference energy from adjacent channels. As noted previously, however, it is often a challenge to accurately identify the presence of an actual broadcast and as may be applicable, to then properly select the proper range for this bandwidth so that only the energy of the desired channel is captured, for example, as opposed to energy from adjacent channels on one or both sides of the desired channel. Focusing on just the upper-frequency side of the desired channel for discussion purposes, the first channel immediately adjacent to the desired channel may be referred to as the first adjacent channel, and the next channel to the upper side of the desired channel may be referred to as the second adjacent channel.

In connection with the present disclosure and for certain example embodiments, it has been discovered that the actual presence of a broadcast signal at the first adjacent channel can be realized by detecting (e.g., measuring) certain signal properties of the first/second adjacent channels to the desired channel and effecting the setting (to select the proper range for this desired bandwidth) based on the exclusion of adjacent channels in certain situations such as where the signal properties indicate that the detected energy in the first adjacent channel corresponds to energy caused by modulation in one or both channels on either side of the first adjacent-channel (e.g., due to circuit-caused anomalies and/or over-modulation of the adjacent channel(s)) and ultrasonic noise from the adjacent channel(s).

Various methods can be used to measure the signal strength of the desired and adjacent channels but it is appreciated that in applications requiring more selectivity and, in many instances, better audio quality, a more accurate and reliable detection method and circuitry is important. A specific example in this regard is in connection with scanning efforts to determine where actual broadcast channels may be present and distinguishing the desired channels from the others part of the relevant spectrum. This discernment for detecting an actual broadcast in an adjacent channel (versus a false-positive), may be important in such applications where the bandwidth of the desired channel should not be set too narrow or too wide in light of the adjacent channels. Accordingly, in connection with certain aspects of the instant disclosure, a more reliable scanning approach has been realized by detecting relative signal properties and, in some instances, signal strengths for the desired channel and for the adjacent channel(s) so that there is accurate discernment of the cause of the detected energy in the adjacent channel(s).

As another specific example, for a system where the adjacent channel is used to determine or set the bandwidth of the desired channel, the bandwidth of the desired channel is set only after it is determined that an adjacent channel is indeed present. In situations where the adjacent channel does not manifest itself in a signal of sufficient signal strength, the system sets the bandwidth not relatively narrow relative to a non-existing adjacent channel, but rather on the larger available bandwidth as required for the optimum audio quality.

In another exemplary aspect, the present disclosure uses a scanning algorithm first operates to measure where the nearest real adjacent channel is located, as opposed to detecting all available channels within a band of interest. In this manner, only adjacent channels with signal strengths that are relatively comparable to the signal strengths of the desired channels are detected and accounted for in terms of setting the bandwidth.

With the above approach, such circuitries may advantageously distinguish between the types (real broadcast, false positive, etc.) of detected energy of an adjacent channel. Thus, instead of setting the bandwidth simply relative to measured signal levels at the center frequency of the adjacent channel, according to certain aspects of the present disclosure, energy detected from the adjacent channel(s) is processed first to discern if the energy in the adjacent channel may correspond to a false-positive, such as caused by noise, over-modulation, breakthrough, etc. This discernment may include, for example, detecting that such energy has strong sine wave modulation (e.g., a deviation of approximately the channel spacing will create more energy in the adjacent channel path than in the signal path of the desired channel). With a system operating in accordance with such aspects of the present disclosure, the signal energy at the location of the adjacent does not have to be accepted.

According to other examples, RF-based embodiments include specific circuits such as one of those characterized above. In one such example, the circuitry includes signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an ultrasonic noise detector. In another such example, the circuitry includes signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an unbalance detector.

In another such example, the circuit includes signal-processing circuitry to discern and indicate whether the detected energy for the first adjacent channel corresponds to energy of an actual broadcast signal corresponding to an FM broadcast signal within the particular bandwidth based on operation, at the frequency immediately adjacent to a targeted one of the plurality of target channels, of a level-detection circuit to assess relative differences in modulation-signal strength for the first adjacent-channel and the targeted one of the plurality of target channels and on operation of at least one of an ultrasonic noise detector and an unbalance detector.

As with previous offset/unbalance detectors, the above-characterized unbalance detector may be configured to average the MPX value. For a nice clean signal the average of the MPX signal indicates the frequency offset/unbalance of the signal-transmission/reception combination. For FM in a general example, this may be a value well below 10 kHz (e.g., 3-7 kHz). In a more specific example embodiment, the above-characterized offset detector may also be configured to operate on a modulation signal, such as the MPX value (e.g., an adjacent channel spacing of 100 kHz) with appreciation that the adjacent modulation energy can take over the FM demodulator of the FM receiver (since an FM demodulator would typically demodulate the strongest channel via what is called, capture effect). If this happens, the output frequency of the FM demodulator would be the adjacent channel spacing (e.g., 100 kHz). Therefore, the above-characterized offset detector may be configured in light of this condition where the demodulator may be taken over by the adjacent channel where the average of the offset will go towards the side of that adjacent channel (e.g., either + or −100 kHz). So when a large offset is detected/measured as such, the above-characterized offset detector indicates that a lot of the detected/measured energy is caused by the adjacent channel and not the signal to be measured. In one specific example, the above-characterized offset detector may be implemented using a pair of bandpass filters to measure the energy on two sides of the signal. These signals could then be compared to gain a measure of imbalance. Accordingly, by appreciating or taking into account the type of energy which may cause circuitry to indicate energy at the frequency detected/measured for the channel adjacent to the desired channel, the exclusion of the adjacent channel may be realized (and the bandwidth may be set accordingly) for reliable processing and/or scanning. Such circuitry and methodology may be appreciated in connection with FIG. 1A and FIG. 1B which respectively show in accordance with aspects of the present disclosure, a block diagram of an RF-based circuit and conditions associated with types of energy which may cause the circuitry to indicate such energy at the adjacent channel(s).

With reference to FIG. 1A and relating to the above-disclosed example aspects and embodiments, FIG. 1A illustrates an example of FM radio receiver circuitry showing a specific approach for providing bandwidth control for receiving a desired channel, consistent with some of the above-discussed aspects and features including measurement of and reliance on measured properties of one or both immediately-adjacent channels (e.g., first and second contiguously adjacent channels on one side of the desired channel). It will be appreciated, however, that other circuits may also be used.

In the example of FIG. 1A, a circuit-based FM radio-channel receiver, in accordance with the present disclosure, includes an antenna 108, an RF signal processor circuit 110 having adjacent channel discernment algorithm, and optionally, a circuit 112 to suppress or exclude adjacent channels for which energy detected in the adjacent channel frequency, based on a fixed spacing for separating the adjacent channels, does not correspond to actual RF signal broadcasting. In various examples, the circuit 112 may be a separate circuit or a circuit-based module such as a part of the processor circuit 110. In the circuit 110, the adjacent channel discernment algorithm circuit 110 may provide an output to indicate whether, for a given frequency (e.g., selected bandwidth) centered at or associated with an adjacent channel, detected energy corresponds to actual RF signal broadcasting and/or to indicate a type of such energy. Such an output may be used for a variety of reasons including, as examples, scanning the RF channels to identify broadcast signals along the relevant FM broadcast spectrum at the channel spacing, and/or indicating whether or not such a real broadcast has been detected at that location such as for testing purposes generally or in interference-prone areas such as the mountains.

Figure 1B:
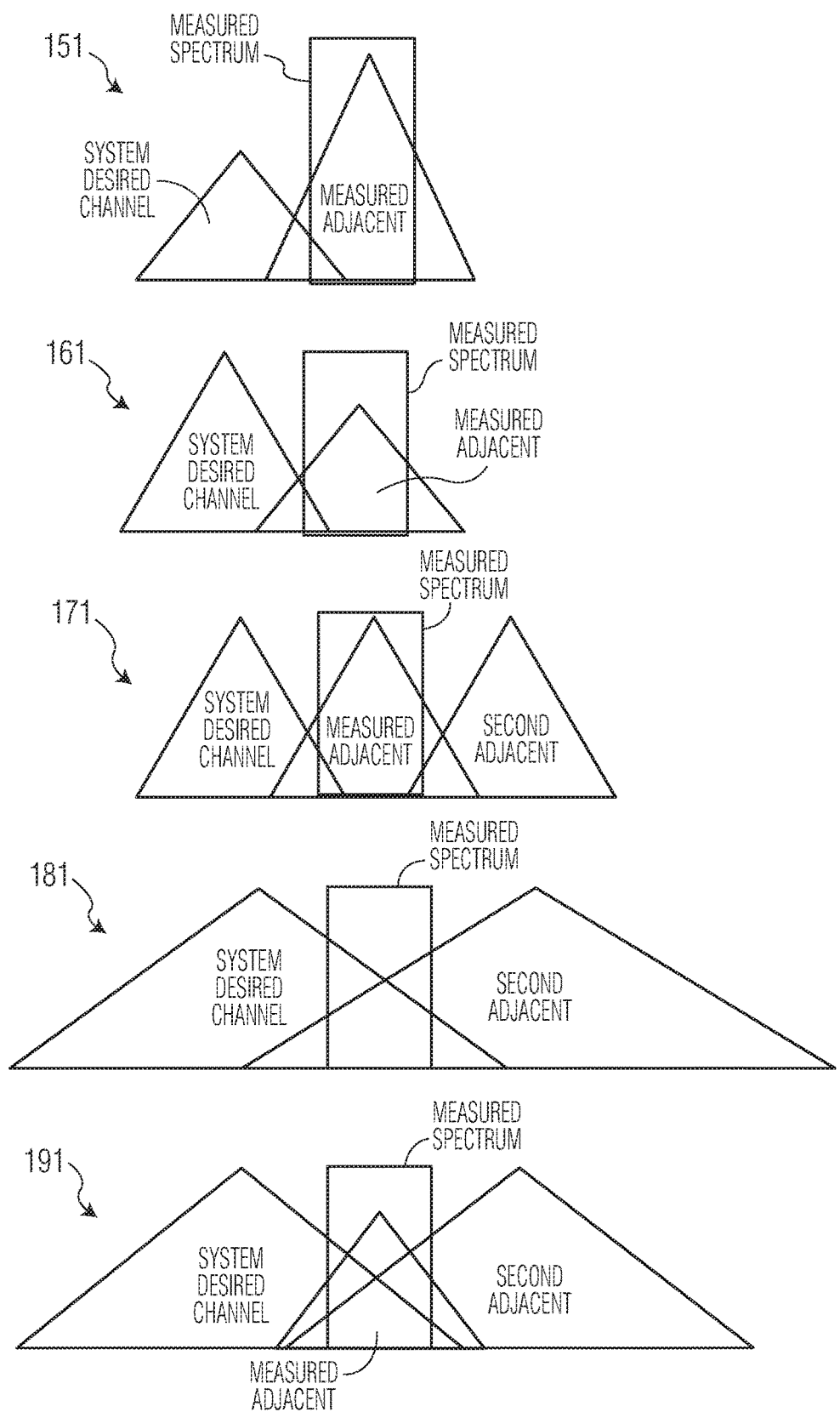
FIG. 1B is a set of related frequency spectrum diagrams of energy situations for which the exemplary circuitry of FIG. 1A may be configured to process, also in accordance with the present disclosure.

FIG. 1B is a set of related frequency spectrum diagrams or snapshots of energy situations for which the exemplary circuitry of FIG. 1A may be configured to process and/or discern, also in accordance with the present disclosure. In order, these snapshots are depicted as 151, 161, 171, 181 and 191. To best appreciate exemplary aspects of the present disclosure, consider first a relatively complex situation which corresponds to the last of the illustrated spectrum snapshot situations (snapshot 191) and for which the circuit 100 of FIG. 1A is configured to detect. For this example, assuming that the circuit 100 is configured to detect, at a channel adjacent to the desired channel (as spaced per the fixed channel spacing), an indication of offset or unbalance detection to indicate if the energy of the demodulated signal more so due to contributions from the lower or upper side of the adjacent channel; and an ultrasonic noise indication to indicate energy being present from one or both of the channels at the lower and upper sides of the adjacent channel. In this example, the circuit 100 may also include an adaptive level detection to measure the relative amplitudes of the demodulated signals corresponding to the adjacent channel and the desired channel.

For this relatively complex situation associated with snapshot 191, the circuit 100 is able to discern sufficient information, regarding the type of energy which may have caused the circuitry to indicate the detected/measured energy at the adjacent channel, to report that the energy is a broadcast signal as may be appropriate for the system, or rather a false positive due to energy of the channels on either side. This discernment may be realized by assessing, for example, the indication of offset detection (indicating if the energy of the demodulated signal more so due to contributions from the lower or upper side of the adjacent channel) and the ultrasonic noise indication (indicating if the energy is from one or both of the channels at the lower and upper sides of the adjacent channel). If the energy is from over-modulation of one or both of the channels at the lower and upper sides of the adjacent channel, this situation is oftentimes more difficult to recognize.

Less complex situations are depicted with snapshots 151 and 161. In snapshot 151, the circuit 100 is able to discern sufficient information, regarding the type of energy which may have caused the circuitry to indicate the detected/measured energy at the adjacent channel, to report that the energy is a broadcast signal as may be appropriate for the system, or rather a false positive due to energy of the channels on either side. This discernment may be realized by assessing, for example, the indication of high RF level (indicating if the energy of the demodulated signal is relatively large as compared to the desired channel) using an adaptive level circuit. High level RF detection indicates adjacent channel breakthrough. This may allow circuit 110 to signal circuit 112 to perform suppression when using this channel as an adjacent RF broadcast signal is present.

In connection with snapshot 161, the offset detection may be used to discern this detected-energy situation. Such offset detection is used to indicate if adjacent channel breakthrough from one side only (desired channel or a second adjacent on the other side of the first adjacent channel) is creating the detected energy at the adjacent channel. In this example, the adaptive signal detector would indicate a low level and the USN detector would indicate a low level also. The combination of detected offset, medium signal level and low USN level can give clear indication that that there is an adjacent channel present.

As an example, offset detection may be accomplished by filtering the MPX spectrum with a low pass filter. The level of the filter output can give an indication of offset if one side of the measured spectrum energy does not balance with the other side. In a situation of unbalance, the filter level will indicate a high level which can be used by circuit 110 to signal circuit 110 to perform suppression when using this channel as an adjacent RF broadcast signal is present.

The snapshots 171 may be more complex in that it involves a condition where the energy of the measured spectrum is affected by the two adjacent channels of the desired channel (first adjacent channel, and second adjacent channel). In this example the offset detector described above will not indicate an adjacent channel present. An adaptive level detection circuit may indicate a medium level of energy present in the measured spectrum. A USN detector circuit may detect low energy in a portion of the measured spectrum that should be at a low level. The combination of no offset, medium signal level and low USN level can give clear indication that that there is an adjacent channel present.

The snapshots 181 illustrates a condition where the energy of the measured spectrum is affected by the second adjacent channel only. In this situation, an adaptive level detection circuit may indicate a medium level of energy present in the measured spectrum. Also, a USN detector circuit may detect a high level of energy in a portion of the measured spectrum that should be at a low level. The combination of no offset, medium signal level and high USN level can give clear indication that that there is no adjacent channel present.

It should be apparent to one skilled in the art, that measuring USN level is only one way of detecting intrusion into the demodulated bandwidth. There may be other methods that can be used to measure this intrusion.

The snapshots 191 illustrates a condition where the energy of the measured spectrum is affected by the two adjacent channels of the desired channel (first adjacent channel, and second adjacent channel) with the second adjacent channel being over-modulated sufficiently to overlap the desired channel spectrally. In this example, an adaptive level detection circuit may indicate a medium level of energy present in the measured spectrum. Also, a USN detector circuit may detect a medium level of energy in a portion of the measured spectrum that should be at a low level. The combination of no offset, medium signal level and medium USN level can give clear indication that that there is an adjacent channel present.

Figure 2:
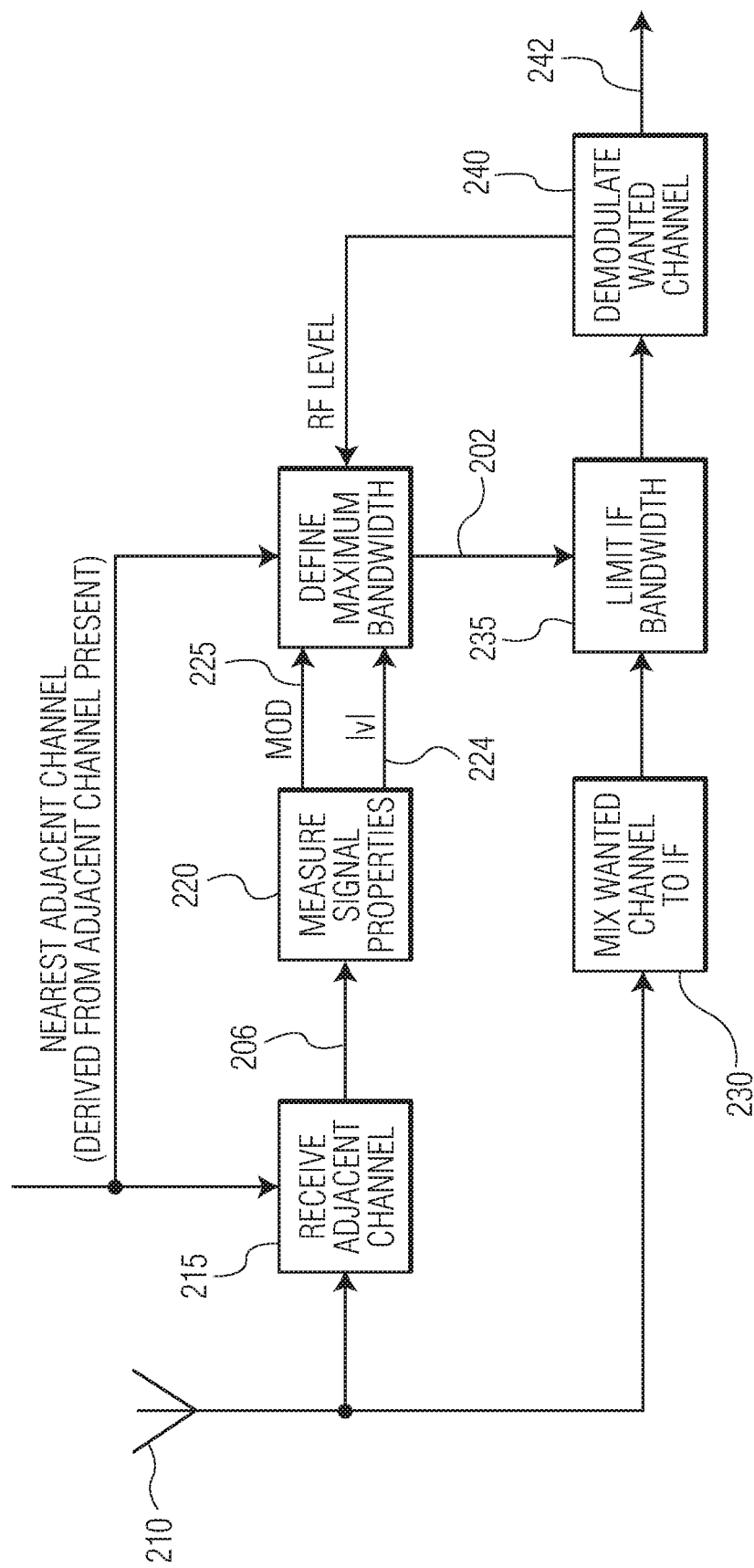
FIG. 2 is a frequency spectrum diagram, illustrating an exemplary set of overlapping channels as may be broadcast by an FM radio broadcasting system being monitored by a radio-frequency radio receiver such as disclosed in connection with FIG. 1A.
Figure 3:
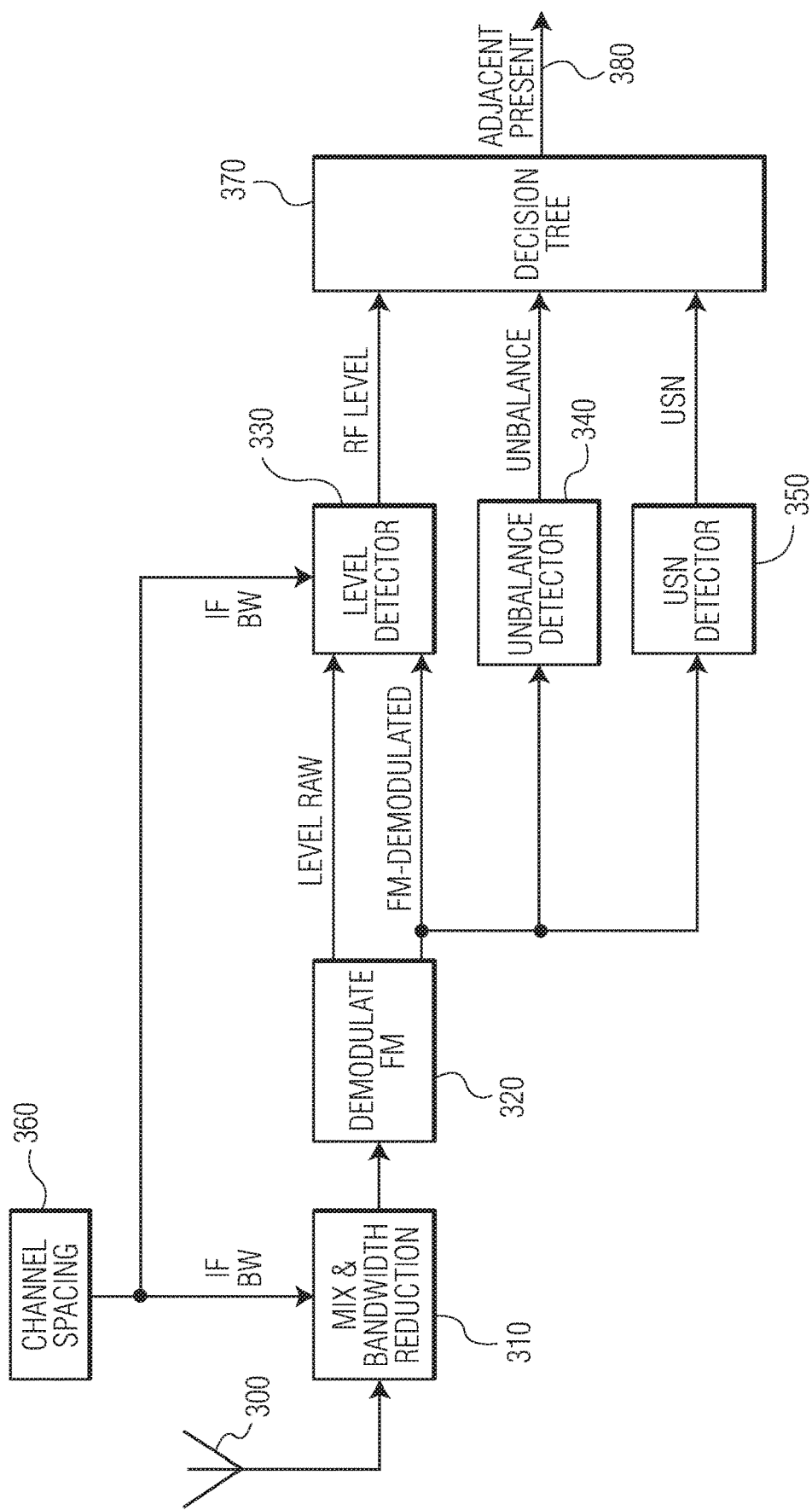
FIG. 3 is another circuit-based block diagram showing one example of how parts of the FM radio reception circuitry of FIG. 1A may be implemented as a specific apparatus, also in accordance with the present disclosure.

FIGS. 2 and 3 are block diagrams of circuit-based RF circuits showing an example of how parts of the FM radio reception circuitry of FIG. 1A may be implemented, also in accordance with the present disclosure.

Turning now to the drawings and relating to the above-disclosed aspects and embodiments, FIG. 2 illustrates an example of FM radio receiver circuitry showing a specific approach for providing bandwidth control for receiving a desired channel, consistent with some of the above-discussed aspects and features including measurement of and reliance on measured properties of one or both immediately-adjacent channels. It will be appreciated, however, that other circuits may also be used.

In this example of FIG. 2, an approach for providing bandwidth control involves a control signal provided via a line 202. This control signal is developed by processing a desired channel from an antenna 210. In this example approach, the antenna 210 may be used to receive an FM broadcast radio signal for presentation to a configurable receiver system with circuitry 215 configured as depicted in FIG. 2 for processing the signal relative to processing of an adjacent channel picked up by the antenna 110. A signal path for this adjacent channel is shown as 206 with data flowing from left to right through the upper row of the circuitry 215. Further, the circuitry 215 (not shown) may also process other adjacent channels (e.g., one on either side of the desired channel) using the antenna 110 and/or using other not-shown antenna(s) operating in tandem. As one of many examples of circuitry that may be used and configured as disclosed herein, the circuitry 215 may be implemented using a commercially-available product such as SAF4000 available from NXP Semiconductors N.V. Alternatively, the circuitry 215 may also be implemented as a chipset with an integrated software defined-radio approach capable of covering a variety of global broadcast audio standards, including not only FM, but others such as AM, DAB+, DRM(+) and HD.

Continuing with FIG. 2, at the left side of FIG. 2, a bandwidth control system for an FM radio signal uses the antenna 210 to pick up the FM signal at a frequency range corresponding to the spectrum inclusive of the desired (FM) channel and at least one (immediately-adjacent) channel on either side of the desired FM channel. Also at the front end of the radio receiver or apparatus of FIG. 2, RF-filtering and amplification circuitry 215 is used to present the FM signals, which are relevant to the frequency range, to a signal-measurement/detection circuit 220. In more specific examples consistent with FIG. 2, the circuitry 215 may be configured in various ways, such as including IF bandwidth control circuitry (not shown), to receive the adjacent channel.

From the circuit 220, the relevant measured signal properties, for example, including an indication of FM modulation level of the other (possibly-interfering) channel, are presented to a bandwidth (BW) control circuit 225 which is used to set the maximum bandwidth based on these measured signal properties and using, for example, an inverse relationship relative to an indication of the FM modulation such as the modulation level and/or the modulation index. In a more specific example, the measured signal properties take into account an inverse relationship between the FM modulation level of another adjacent channel and the amount for which the bandwidth is to be set. Using a processing circuit with or for such circuit-based blocks, this relationship may assessed and characterized in that, based on a relatively large indication of FM modulation level of the other channel, the step of setting a bandwidth for receiving a desired channel includes setting a relatively narrow bandwidth; whereas based on a relatively small indication of FM modulation level of the other channel. In certain RF environments and for certain FM systems and other devices (including FM receivers) where bandwidth selection of and/or control over a desired channel may be beneficial due to potential signal distortion involving the immediately-adjacent channels, an estimate of the spectrum of the adjacent channels may be obtained to select the proper bandwidth and to mitigate and/or overcome adjacent-channel issues including latch up.

Concurrent with the operation of the RF-filtering and amplification circuitry 215, an FM signal mixer 230 is used to down convert the received FM signal an intermediate frequency (IF) as is conventional. An output of the FM signal mixer 230 provides an IF signal to bandwidth selective/controlling circuitry 230 including, for example, a band-pass filtering circuit. Using the maximum bandwidth as provided by the circuit 225, the circuitry 235 provides a selected bandwidth range for the IF signal to be processed by a demodulator 240. In certain specific examples consistent with the example depicted in FIG. 2, the demodulator 240, which outputs the demodulated signal of the desired channel at port 242, may be further configured to provide the RF level to the bandwidth (BW) control circuit 225 so as to provide feedback and in some instances even to drive the selection (e.g., dynamically) based on ongoing further measurements of the signal properties as may be provided in an ongoing manner from the circuit 220 and/or provided from other criteria such as: based on measured distortion of the desired channel; empirical data relating to reports of previous signal receptions; and/or an method for increasing the reliability of an estimation/measurement of the RF spectrum signal properties.

In the example shown in FIG. 3, an illustration of an adjacent signal detection system. This circuit-based adjacent signal detection system, in accordance with the present disclosure, includes FM receiver (circuitry) with a bandwidth control system for an FM radio signal that uses an antenna 300 to pick up the FM signal at a frequency range corresponding to the spectrum inclusive of the desired (FM) channel and at least one (immediately-adjacent) channel on either side of the desired FM channel. At the front end of the radio receiver or apparatus of FIG. 3, RF-filtering, mixing, and amplification circuitry 310 is used to present the FM signals, which are relevant to the frequency range, to a FM demodulator circuit 320. This demodulator circuit extracts information from the received adjacent signal and presents these two signals, as the level of the raw signal (e.g., Level RAW) and a more-finely processing demodulated signal (e.g., MPX) to the three detector circuits 330, 340, and 350 as shown. The Level RAW signal provides a representation of the signal energy in the measured spectrum. The measured spectrum is the portion of the adjacent spectrum with a bandwidth controlled by the channel spacing circuitry 360, which is controlled by other sections of the FM receiver systems not shown here. This bandwidth is, in part, related to the local channel spacing of the FM radio regulations (for example, including 100 kHz and 200 kHz). The channel spacing circuitry present the IF bandwidth signal to circuitry 310. The MPX signal presents a signal spectrum of the MPX FM signaling in the adjacent channel.

Now moving to the detectors in FIGS. 3 (330, 340, and 350). The adaptive level detector 330, takes as an input the Level Raw and MPX signals from the FM demodulator 320. Along with this, it takes an IF bandwidth signal from the channel spacing circuitry 360 described above. Using these signals it uses techniques such as, but not limited to, filters, mixers, FFTs, etc. to create an output signal which indicates a power level of the RF adjacent channel selected bandwidth. This signal is presented to the decision tree 370.

Example circuit 340 is an offset detector which takes as input, the MPX signal provided by 320. Along with this, it takes an IF bandwidth signal from the channel spacing circuitry 360 described above. Using these signals it uses techniques such as, but not limited to, filters, mixers, FFTs, etc. to create an output signal which indicates the power level of measured offset, or imbalance of power, between the lower and upper frequencies of the RF adjacent channel selected bandwidth. This signal is presented to the decision tree 370.

Example circuit 350 is an USN detector which takes as input, the MPX signal provided by 320, along with an IF bandwidth signal from the channel spacing circuitry 360 described above. Using these signals it uses techniques such as, but not limited to, filters, mixers, FFTs, etc. to create an output signal which indicates the power level of measured USN signal, or imbalance of power, between the lower and upper frequencies of the RF adjacent channel selected bandwidth. This signal is presented to the decision tree 370. In example circuitry of the decision tree 370, we have inputs from the RF level signal provided by 330, frequency offset signal provided by 340, and USN signal provided by 350. The circuitry of 370 uses these three signal in an algorithmic or formulaic way to create an output signal 380 that indicates whether or not an adjacent signal is present. The output signal can be, for example, a binary (yes/no) or it can be numerical value indicating a level of certainty/uncertainty. As another example of a decision tree, the inputs could provide inputs to a previously train AI neural network, while the output of the neural network presents the adjacent present signal 380.

Circuitry, such as illustrated (e.g., blocks in FIGS. 1-3) as may be used to monitor the energy and/or modulation associated of one or both of these adjacent channels, may be implemented using a commercially-available product such as SAF4000 available from NXP Semiconductors N.V. Alternatively, such circuitry may also be implemented as a chipset with an integrated software defined-radio approach capable of covering a variety of global broadcast audio standards, including not but not necessarily limited to FM.

In certain non-limiting experimental-test embodiments, the above-described approaches for accurate scanning has realized impressive results. One such system embodiment has been tested successfully with several types of audio (including short audio bursts, with silence in between, wide spectrum audio, etc.). In all tested situations, the desired channel has been maintained as being clean of interference, breakthrough and/or false positives when detecting/measuring energy in the adjacent channel. This has been realized with several settings of the signal level difference, testing performed on various channel spacings including 100 kHz and 200 kHz.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, processor, converter, controller, and/or other circuit-type depictions (e.g., reference numerals/blocks in FIGS. 1 and 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown and discussed in the present disclosure. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. In more specific examples, wherein logic circuitry may correspond to or refer to a code-programmed/configured CPU, the logic circuitry may carry out a process or method by performing certain signal manipulation/processing activities in the various manners as exemplified characterized herein. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not necessarily depart from the true spirit and scope of various aspects of the disclosure, including aspects set forth in the claims.

What is claimed is:

1. A method performed by RF receiver circuitry to receive frequency modulated (FM) broadcast signaling within a particular bandwidth for which a plurality of target channels are to have a specified channel spacing, the method comprising:

assessing detected energy for a first adjacent channel having the specified channel spacing and having a frequency immediately adjacent to a targeted one of the plurality of target channels; and discerning whether the detected energy is associated with:
ultra-sonic energy in detected modulation; and modulation signal energy from a second adjacent channel having the specified channel spacing and having a frequency immediately adjacent to the first adjacent channel.

2. The method of claim 1, further including scanning the plurality of target channels by repeating the aforesaid steps a plurality of times to progress signal reception circuitry through a sequence of frequency or bandwidth settings associated with the specified channel spacing.

3. The method of claim 1, further including using signal-processing circuitry and a level-detection circuit to assess relative differences in modulation-signal strength for each set of: first adjacent-channels and the targeted one of the plurality of target channels.

4. The method of claim 1, further including using signal-processing circuitry to discern and indicate whether the detected energy for the first adjacent channel corresponds to energy of an actual broadcast signal corresponding to an FM broadcast signal within the particular bandwidth.

5. The method of claim 1, further including using signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an ultrasonic noise detector.

6. The method of claim 1, further including using signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an unbalance detector.

7. The method of claim 1, further including using signal-processing circuitry to discern and indicate whether the detected energy for the first adjacent channel corresponds to energy of an actual broadcast signal corresponding to an FM broadcast signal within the particular bandwidth based on operation, at the frequency immediately adjacent to a targeted one of the plurality of target channels, of a level-detection circuit to assess relative differences in modulation-signal strength for the first adjacent-channel and the targeted one of the plurality of target channels and on operation of at least one of an ultrasonic noise detector and an unbalance detector.

8. The method of claim 1, further including using signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an ultrasonic noise detector and an unbalance detector.

9. The method of claim 1, further including using signal-processing circuitry to discern and indicate whether the detected energy for the first adjacent channel corresponds to energy of an actual broadcast signal corresponding to an FM broadcast signal within the particular bandwidth, by the signal-processing circuitry stepping through a decision tree based on discernment of: the ultra-sonic energy in detected modulation as indicated by an ultra-sonic noise detector operating on demodulated signal energy; the modulation signal energy from a second adjacent channel as indicated by an unbalance detection circuit operating relative to the demodulated signal energy; and relative differences in modulation-signal strength for the first adjacent-channel and the targeted one of the plurality of target channels as indicated by a level-detection circuit.

10. The method of claim 1, further including adaptively setting a bandwidth limit for circuitry to receive one or more of the plurality of target channels including said targeted one of the plurality of target channels.

11. The method of claim 1, wherein signal-processing circuitry establishes a bandwidth for said targeted one of the plurality of target channels, based on specified channel spacing and signal strength of said adjacent channels, and further based on an extent to which energy from one of said adjacent channels intrudes on or is from said one of the plurality of target channels.

12. The method of claim 1, further including using signal-processing circuitry, including a programmed computer, to discern and indicate whether the detected energy for the first adjacent channel corresponds to energy of an actual broadcast signal corresponding to an FM broadcast signal within the particular bandwidth, and the signal-processing circuitry discerning: the ultra-sonic energy in detected modulation; the modulation signal energy from a second adjacent channel; and relative differences in modulation-signal strength for the first adjacent-channel and the targeted one of the plurality of target channels.

13. The method of claim 1, wherein the step of discerning includes determining whether the first adjacent channel carries a broadcast signal of an apparent channel signal strength by:
discerning whether the detected energy for the first adjacent channel is associated with a detected modulation signal in the first adjacent channel and ultra-sonic noise; and
discerning whether the detected energy for the first adjacent channel includes modulation signal energy from the second adjacent channel.

14. An apparatus comprising:
RF receiver circuitry to receive frequency modulated (FM) broadcast signaling within a particular bandwidth for which a plurality of target channels are to have a specified channel spacing,
circuitry to respond to the RF receiver circuitry by
assessing detected energy for a first adjacent channel having the specified channel spacing and having a frequency immediately adjacent to a targeted one of the plurality of target channels; and
discerning whether the detected energy is associated with ultra-sonic energy in detected modulation, and modulation signal energy from a second adjacent channel having the specified channel spacing and having a frequency immediately adjacent to the first adjacent channel.

15. The apparatus of claim 14, wherein the circuitry to respond to the RF receiver circuitry is to discern and indicate whether the detected energy for the first adjacent channel corresponds to energy of an actual broadcast signal corresponding to an FM broadcast signal within the particular bandwidth, and to discern: the ultra-sonic energy in detected modulation; the modulation signal energy from a second adjacent channel; and relative differences in modulation-signal strength for the first adjacent-channel and the targeted one of the plurality of target channels.

16. The apparatus of claim 14, further including using signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an ultrasonic noise detector.

17. The apparatus of claim 14, further including using signal-processing circuitry to discern and indicate whether the detected energy for the first adjacent channel corresponds to energy of an actual broadcast signal corresponding to an FM broadcast signal within the particular bandwidth based at least in part on operation, at the frequency immediately adjacent to a targeted one of the plurality of target channels, of an unbalance detector.

18. The apparatus of claim 14, further including using signal-processing circuitry to discern and indicate whether the detected energy for the first adjacent channel corresponds to energy of an actual broadcast signal corresponding to an FM broadcast signal within the particular bandwidth based on operation, at the frequency immediately adjacent to a targeted one of the plurality of target channels, of a level-detection circuit to assess relative differences in modulation-signal strength for the first adjacent-channel and the targeted one of the plurality of target channels and on operation of at least one of an ultrasonic noise detector and an offset detector.

19. The apparatus of claim 14, wherein the circuitry to respond to the RF receiver circuitry is to indicate whether the detected energy for the first adjacent channel corresponds to energy of an actual broadcast signal corresponding to an FM broadcast signal within the particular bandwidth, and to discern levels of the ultra-sonic energy in detected modulation; the modulation signal energy from a second adjacent channel; and relative differences in modulation-signal strength for the first adjacent-channel and the targeted one of the plurality of target channels.

20. The apparatus of claim 14, wherein the circuitry to respond to the RF receiver circuitry is to discern whether the first adjacent channel carries a broadcast signal of an apparent channel signal strength by:
   discerning whether the detected energy for the first adjacent channel is associated with a detected modulation signal in the first adjacent channel and ultra-sonic noise; and
   discerning whether the detected energy for the first adjacent channel includes modulation signal energy from the second adjacent channel.

\* \* \* \* \*